United States Patent
Driscoll et al.

(10) Patent No.: US 10,137,764 B2
(45) Date of Patent: Nov. 27, 2018

(54) ELECTRO-OPTIC WINDOW CONTROL SYSTEM

(71) Applicant: Gentex Corporation, Zeeland, MI (US)

(72) Inventors: David I. Driscoll, Caledonia, MI (US); Christopher J. Adamski, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 8 days.

(21) Appl. No.: 15/599,510

(22) Filed: May 19, 2017

(65) Prior Publication Data

US 2017/0334271 A1 Nov. 23, 2017

Related U.S. Application Data

(60) Provisional application No. 62/339,178, filed on May 20, 2016.

(51) Int. Cl.
*B60J 3/04* (2006.01)
*G02F 1/00* (2006.01)
(Continued)

(52) U.S. Cl.
CPC ............... *B60J 3/04* (2013.01); *B60R 1/001* (2013.01); *G02F 1/0018* (2013.01);
(Continued)

(58) Field of Classification Search
CPC ....... H04W 4/00; H04W 4/043; H04W 4/046; H04W 4/30; H04W 4/33; H04W 4/48;
(Continued)

(56) References Cited

U.S. PATENT DOCUMENTS 3,521,941 A 7/1970 Deb et al.
4,640,583 A 2/1987 Hoshikawa et al.
(Continued)

FOREIGN PATENT DOCUMENTS

EP 0947874 A2 10/1999
EP 0947875 A2 10/1999
(Continued)

OTHER PUBLICATIONS

Sullivan, R. et al., "Effect of switching control strategies on the energy performance of electrochromic windows," SPIE vol. 2255, pp. 443-455 (Feb. 1994).
(Continued)

*Primary Examiner* — Loha Ben
(74) *Attorney, Agent, or Firm* — Price Heneveld LLP; Bradley D. Johnson

(57) ABSTRACT

A window control system is provided that includes a plurality of electro-optic windows each having a variable transmittance level, a portable control unit for generating wireless control signals for controlling the transmittance level of the electro-optic windows, and a plurality of window control circuits each coupled to a respective one of the electro-optic windows and each having a transceiver for receiving the wireless control signals from the portable control unit. Each window control circuit is configured to adjust the transmittance level of the respective one of the electro-optic windows in response to a wireless control signal received by the transceiver from the portable control unit.

26 Claims, 6 Drawing Sheets

(51) Int. Cl.

| | | |
|---|---|---|
| *G02F 1/01* | (2006.01) | |
| *B60R 1/00* | (2006.01) | |
| *H04W 4/00* | (2018.01) | |
| *G06F 3/041* | (2006.01) | |
| *H04W 4/70* | (2018.01) | |
| *G05B 11/01* | (2006.01) | |
| *G05B 19/18* | (2006.01) | |

(52) U.S. Cl.
CPC .......... *G02F 1/0123* (2013.01); *G06F 3/0416* (2013.01); *H04W 4/70* (2018.02); *G05B 11/01* (2013.01); *G05B 19/18* (2013.01); *H04W 4/00* (2013.01)

(58) Field of Classification Search
CPC ..... H04W 4/70; H04W 4/80; H04W 72/1263; B60J 3/04; B60R 1/001; G06F 3/0416; G06F 3/0421; G02F 1/0018; G02F 1/0121; G02F 1/0123; G02F 1/15; G02F 1/153; G02F 1/163; H04B 10/00; H04B 10/04; H04B 10/06; E06B 9/24; E06B 2009/2405; E06B 2009/2464; G08C 17/00; G08C 17/02; H04M 1/72; H04M 1/725; H04M 1/72519; H04M 1/72527; H04M 1/7253; H04M 1/72569; G05B 11/01; G05B 11/06; G05B 19/00; G05B 19/02; G05B 19/04; G05B 19/042; G05B 19/18
USPC ........ 359/245, 265, 275; 700/3, 7–9, 11, 19, 700/20; 345/76, 77, 84, 105; 398/106, 398/128, 130, 135, 140, 153, 162, 182, 398/202
See application file for complete search history.

(56) References Cited

U.S. PATENT DOCUMENTS

| | | |
|---|---|---|
| 4,646,158 A | 2/1987 | Ohno et al. |
| 4,702,566 A | 10/1987 | Tukude |
| 4,893,908 A | 1/1990 | Wolf et al. |
| 4,917,477 A | 4/1990 | Bechtel et al. |
| 5,004,961 A | 4/1991 | Berner et al. |
| 5,066,111 A | 11/1991 | Singleton et al. |
| 5,092,939 A | 3/1992 | Nath et al. |
| 5,124,832 A | 6/1992 | Greenberg et al. |
| 5,136,419 A | 8/1992 | Shabrang |
| 5,161,048 A | 11/1992 | Rukavina |
| 5,228,925 A | 7/1993 | Nath et al. |
| 5,384,578 A | 1/1995 | Lynam et al. |
| 5,384,653 A | 1/1995 | Benson et al. |
| 5,612,847 A | 3/1997 | Malecke et al. |
| 5,654,736 A | 8/1997 | Green et al. |
| 5,657,149 A | 8/1997 | Buffat et al. |
| 5,724,176 A | 3/1998 | Nishikitani et al. |
| 5,724,187 A | 3/1998 | Varaprasad et al. |
| 5,725,809 A | 3/1998 | Varaprasad et al. |
| 5,805,330 A | 9/1998 | Byker et al. |
| 5,838,483 A | 11/1998 | Teowee et al. |
| 5,889,608 A | 3/1999 | Buffat et al. |
| 5,995,273 A | 11/1999 | Chandrasekhar |
| 6,020,989 A | 2/2000 | Watanabe |
| 6,045,724 A | 4/2000 | Varaprasad et al. |
| 6,055,089 A | 4/2000 | Schulz et al. |
| 6,056,410 A | 5/2000 | Hoekstra et al. |
| 6,084,702 A | 7/2000 | Byker et al. |
| 6,166,496 A | 12/2000 | Lys et al. |
| 6,207,083 B1 | 3/2001 | Varaprasad et al. |
| 6,210,008 B1 | 4/2001 | Hoekstra et al. |
| 6,245,262 B1 | 6/2001 | Varaprasad et al. |
| 6,254,003 B1 | 7/2001 | Pettinelli et al. |
| 6,406,152 B1 | 6/2002 | Hoekstra et al. |
| 6,407,847 B1 | 6/2002 | Poll et al. |
| 6,474,820 B1 | 11/2002 | Hoekstra et al. |
| 6,567,708 B1 | 5/2003 | Bechtel et al. |
| 6,621,616 B1 | 9/2003 | Bauer et al. |
| 6,770,068 B2 | 8/2004 | Ruiz et al. |
| 6,829,511 B2 | 12/2004 | Bechtel et al. |
| 6,853,472 B2 | 2/2005 | Warner et al. |
| 6,906,632 B2 | 6/2005 | DeLine et al. |
| 6,961,168 B2 | 11/2005 | Agrawal et al. |
| 6,963,437 B2 | 11/2005 | Bauer et al. |
| 7,085,609 B2 | 8/2006 | Bechtel et al. |
| 7,256,924 B2 | 8/2007 | Guarr et al. |
| 7,274,501 B2 | 9/2007 | McCabe et al. |
| 7,450,291 B2 | 11/2008 | Guarr et al. |
| 7,471,438 B2 | 12/2008 | McCabe et al. |
| 7,535,614 B1 * | 5/2009 | Tapley ........................ B60J 3/04 345/105 |
| 7,542,809 B2 | 6/2009 | Bechtel et al. |
| 7,822,490 B2 | 10/2010 | Bechtel et al. |
| 8,219,217 B2 | 7/2012 | Bechtel et al. |
| 9,892,628 B2 * | 2/2018 | Fischer ................... H04W 4/00 |
| 2004/0160660 A1 | 8/2004 | Malvino |
| 2005/0063036 A1 | 3/2005 | Bechtel et al. |
| 2005/0156753 A1 | 7/2005 | DeLine et al. |
| 2005/0200935 A1 | 9/2005 | Liu et al. |
| 2012/0218618 A1 | 8/2012 | Tonar et al. |
| 2012/0235657 A1 | 9/2012 | Ito et al. |
| 2013/0242370 A1 | 9/2013 | Wang |
| 2014/0236323 A1 | 8/2014 | Brown et al. |
| 2015/0098121 A1 * | 4/2015 | Turnbull ................. G02F 1/163 359/275 |

FOREIGN PATENT DOCUMENTS

| | | |
|---|---|---|
| EP | 0947876 A2 | 10/1999 |
| WO | 9857228 | 12/1998 |
| WO | 2015051262 A1 | 4/2015 |

OTHER PUBLICATIONS

Czanderna, A. W. et al., "Durability issues and service lifetime prediction of electrochromic windows for buildings applications," Solar Energy Materials & Solar Cells, 56 (1999), pp. 419-436.

\* cited by examiner

US 10,137,764 B2

ELECTRO-OPTIC WINDOW CONTROL SYSTEM

CROSS-REFERENCE TO RELATED APPLICATION

This application claims priority to and the benefit under 35 U.S.C. § 119(e) of U.S. Provisional Patent Application No. 62/339,178, filed on May 20, 2016, entitled "ELECTRO-OPTIC WINDOW CONTROL SYSTEM," by David I. Driscoll et al., the entire disclosure of which is incorporated herein by reference.

FIELD OF THE INVENTION

The present invention generally relates to an electro-optic window control system, and more particularly to a window control system for controlling a plurality of electro-optic windows of a vehicle or building.

SUMMARY OF THE INVENTION

According to one aspect of the present invention, a window control system is provided comprising a plurality of electro-optic windows each having a variable transmittance level; a portable control unit for generating wireless control signals for controlling the transmittance level of the plurality of electro-optic windows; and a plurality of window control circuits each coupled to a respective one of the plurality of electro-optic windows and each comprising a transceiver for receiving the wireless control signals from the portable control unit, and each configured to adjust the transmittance level of the respective one of the plurality of electro-optic windows in response to a wireless control signal received by the transceiver from the portable control unit.

According to another embodiment of the present invention, a non-transitory tangible computer readable medium is provided having stored thereon software instructions that, when executed by a processor of a portable control unit, cause the processor to control transmittance levels of a plurality of electro-optic windows by executing the steps comprising: generating a display on a touch screen of the portable control unit showing a physical arrangement of the plurality of electro-optic windows to allow a user to select which of the plurality of electro-optic windows are to be adjusted; receiving the user's selection of which of the plurality of electro-optic windows are to be adjusted; and generating wireless control signals for controlling the transmittance level of the selected electro-optic windows of the plurality of electro-optic windows.

According to another embodiment of the present invention, an aircraft is provided comprising a plurality of electro-optic windows each having a variable transmittance level; and a plurality of window control circuits each coupled to a respective one of the plurality of electro-optic windows and each comprising a transceiver for receiving wireless control signals from a portable control unit, and each configured to adjust the transmittance level of the respective one of the plurality of electro-optic windows in response to a wireless control signal received by the transceiver from the portable control unit.

According to another embodiment of the present invention, a window control system is provided comprising a plurality of electro-optic windows each having a variable transmittance level; a portable control unit for generating wireless control signals for controlling the transmittance level of the plurality of electro-optic windows; a transceiver for receiving the wireless control signals from the portable control unit; and a plurality of window control circuits each coupled to at least one of the plurality of electro-optic windows and configured to adjust the transmittance level of the at least one of the plurality of electro-optic windows in response to a wireless control signal received by the transceiver from the portable control unit.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION OF THE EMBODIMENTS

Figure 1:
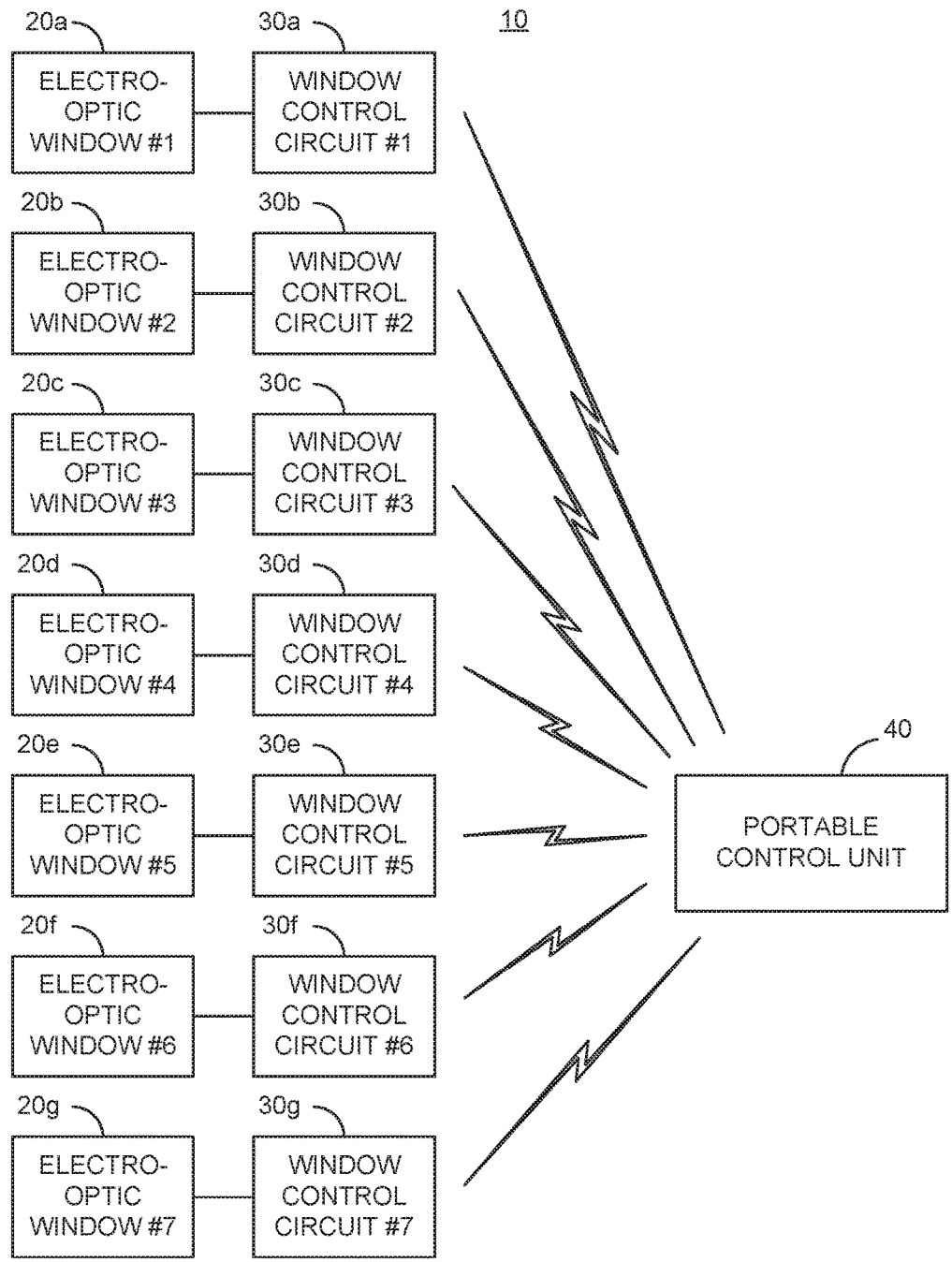
FIG. 1 is an electrical diagram in block form of a window control system according to one embodiment.

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

FIG. 1 shows a window control system 10 according to one embodiment where the system includes a plurality of electro-optic windows 20a-20g each having a transmittance level that is variable in response to electrical signals applied thereto. The system further includes a plurality of window control circuits 30a-30g each coupled to a respective one of the plurality of electro-optic windows 20a-20g and each comprising a transceiver 34 (FIG. 2) for receiving the wireless control signals from a portable control unit 40, and each configured to adjust the transmittance level of the respective one of the plurality of electro-optic windows 20a-20g in response to a wireless control signal received by the transceiver 34 from the portable control unit 40.

Each of the electro-optic windows 20a-20g has a unique ID associated therewith. The portable control unit 40 may store the unique IDs of each of the electro-optic windows 20a-20g such that upon selection of windows to control, the portable control unit 40 incorporates the unique ID of the selected electro-optic windows into the wireless control signals. This feature may be implemented in various ways as will be discussed further below. Each of the window control circuits 30a-30g may store the unique ID for the respective electro-optic window 20a-20g that it controls.

Figure 2:
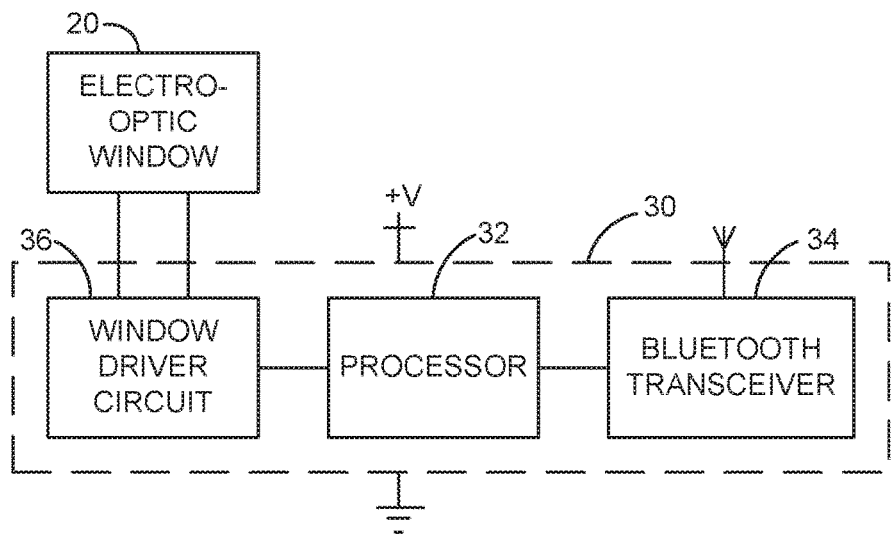
FIG. 2 is an electrical diagram in block form of a window control circuit that may be used in the window control system.

FIG. 2 shows an example of a window control circuit 30 that may be implemented as any or all of window control circuits 30a-30g in FIG. 1. As shown, window control circuit 30 may include a processor 32, a transceiver 34, and a window driver circuit 36. The window driver circuit 36 converts commands, which indicate the desired transmission level for an electro-optic window 20, from the processor 32 into the appropriate voltage level for electro-optic window 20. Electro-optic windows 20-20g may take any form and are preferably electrochromic windows. Examples of suitable electrochromic windows and window drive circuits are disclosed in commonly-assigned U.S. Pat. Nos. 6,407,847; 6,567,708; 7,990,603; 8,736,946; and 9,146,437, the entire disclosures of which are incorporated herein by reference. Such electrochromic windows may be provided in a building or in a vehicle, such as an aircraft.

The processor 32 is coupled to transceiver 34 so as to enable receipt of desired transmission levels in wireless signals from the portable control unit 40. The wireless signals may be radio frequency (RF) signals, may be infrared (IR) signals, may be visible light communication (VLC) or may be optical wireless communications (OWC).

Figure 3:
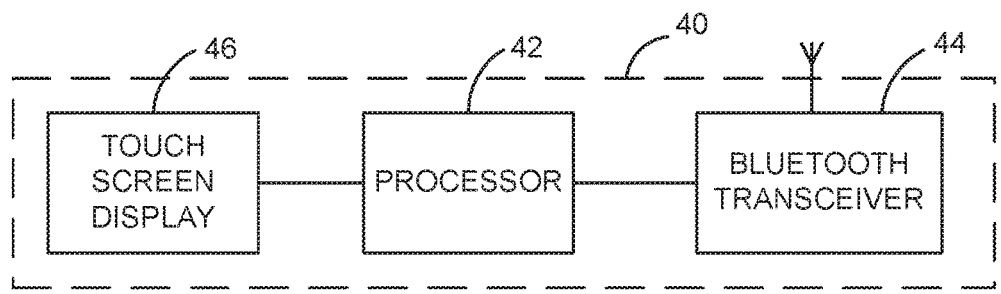
FIG. 3 is an electrical diagram in block form of a portable control unit that may be used in the window control system.

FIG. 3 shows an example of the construction of the portable control unit 40. As shown, the portable control unit 40 may include a processor 42, a transceiver 44, and a touch screen user interface 46. The portable control unit 40 may be a dedicated remote control device or may be implemented as a smartphone, a tablet or a laptop operating under control of a window control app. Thus, although FIG. 3 only shows the processor 42, the transceiver 44, and the touch screen user interface 46, the portable control unit 40 may include various other components of a smartphone, a tablet or a laptop.

The transceiver 34 of each of the window control circuits 30a-30g may be a Bluetooth transceiver and the transceiver 44 of the portable control unit 40 may also be a Bluetooth transceiver for communicating the wireless control signals via a Bluetooth protocol. Thus, the transceiver 44 of the portable control unit 40 may directly and separately communicate with each transceiver 34 of the respective window control circuits 30a-30g so as to control the transmittance levels of windows 20a-20g either individually or in groups as described further below. When utilizing Bluetooth transceivers 34 and 44, window control system 10 may use the Bluetooth address (BD_ADDR) of each Bluetooth transceiver 34 in the respective window control circuits 30a-30g as the unique IDs for the respective electro-optic windows 20a-20g. The manner in which the Bluetooth transceivers 34 of window control circuits 30a-30g may be paired with the Bluetooth transceiver 44 of the portable control unit 40 will be described further below.

As mentioned above, the portable control unit 40 may be implemented using a smartphone or the like operating under control of a window control app. When the app is first opened, there is a set up mode it may execute before entering an operation mode. The set up mode will be described following a description of the operating mode. The app may be implemented as software instructions stored in a non-transitory tangible computer readable medium that, when executed by the processor 42 of the portable control unit 40, cause the processor 42 to control the transmittance levels of the electro-optic windows 20a-20g by generating a display on the touch screen user interface 46 of the portable control unit 40 showing a physical arrangement of the electro-optic windows 20a-20g to allow a user to select which of the electro-optic windows 20a-20g are to be adjusted, receiving the user's selection of which of the electro-optic windows 20a-20g are to be adjusted, and generating wireless control signals for controlling the transmittance level of the selected electro-optic windows. Examples of the displays that may be shown on the touch screen user interface 46 are shown in FIGS. 4A, 4B, 5A, 5B, and 5C.

Figure 4B:
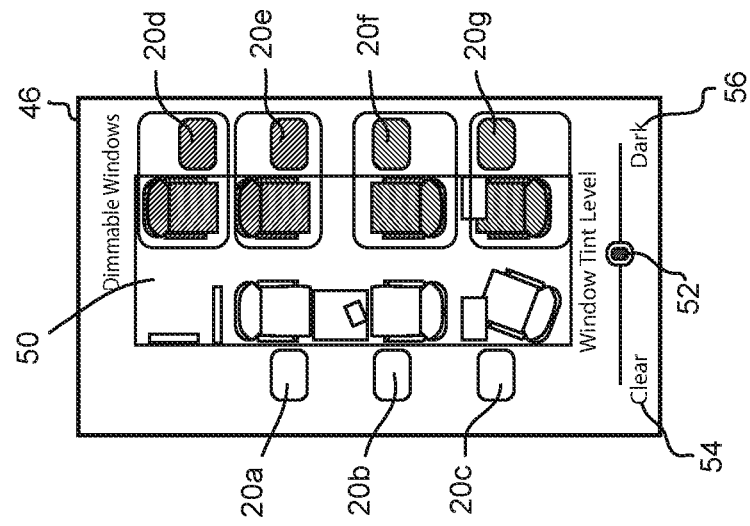
FIGS. 4A and 4B are exemplary displays for a portable control unit used in the window control system.
Figure 4A:
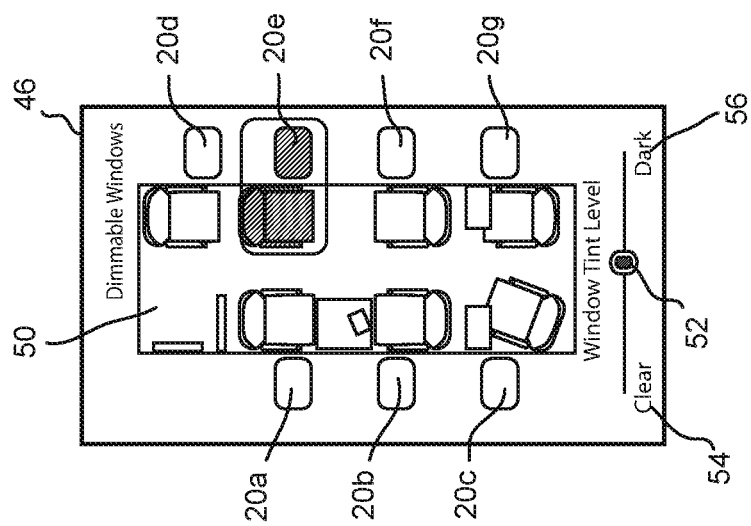
Figure 5C:
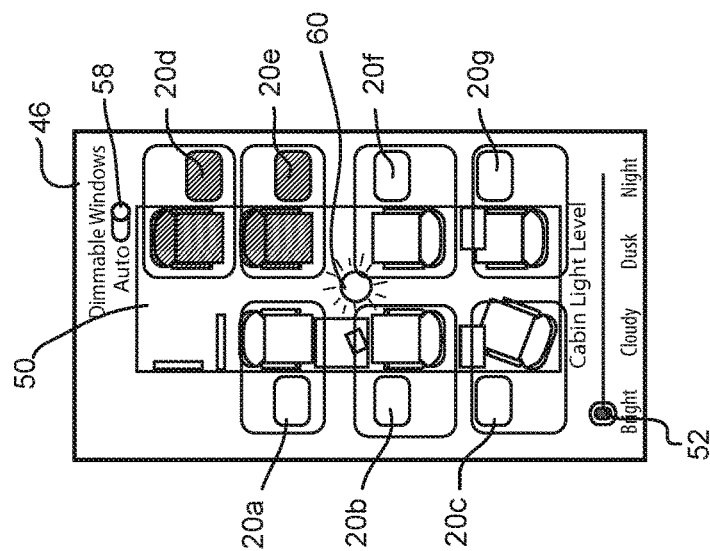
FIGS. 5A-5C are exemplary displays for a portable control unit used in the window control system.
Figure 5B:
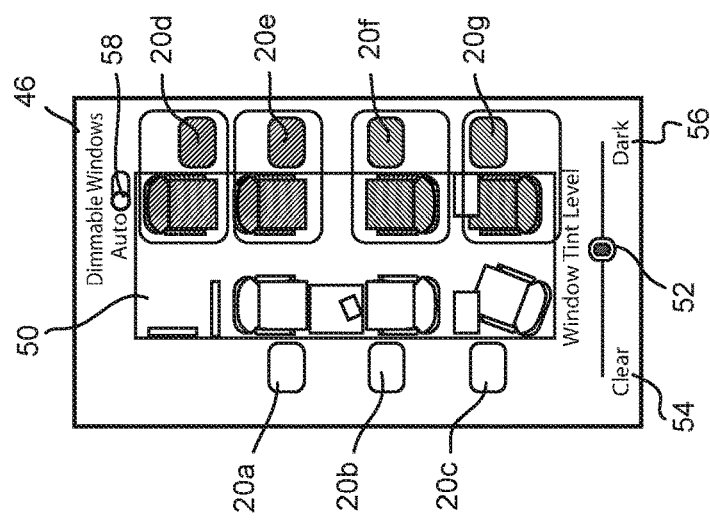
Figure 5A:
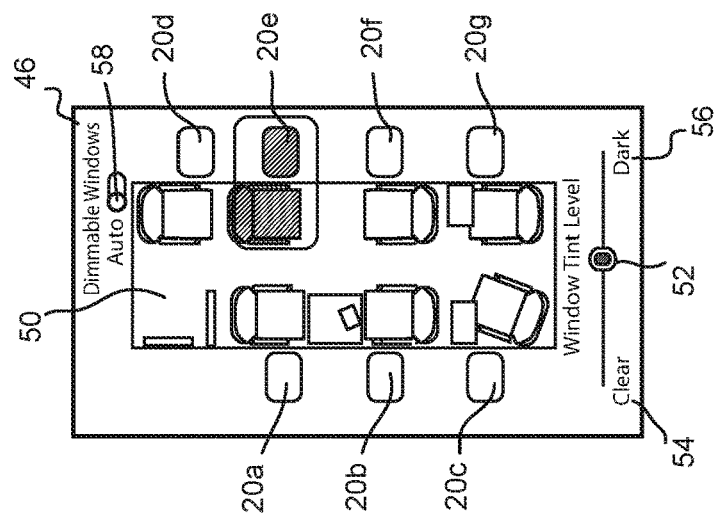

As shown in FIGS. 4A, 4B, 5A, 5B, and 5C, the display on the touch screen user interface 46 may show a physical arrangement 50 of the electro-optic windows 20a-20g within their environment to allow a user to easily identify the windows within the environment and to select which of the electro-optic windows 20a-20g they wish to adjust. In the examples shown, the environment is a small aircraft. A user may select an electro-optic window to control by pressing in the window/seat area on the touch screen user interface 46, which responds by highlighting the selected window/seat area. In FIGS. 4A and 5A, the selected electro-optic window is window 20e. More than one window may be selected as shown in FIGS. 4B, 5B, and 5C. For example, electro-optic windows 20d, 20e, 20f, and 20g are selected and highlighted in FIGS. 4B and 5B, and all of the electro-optic windows 20a-20g are selected and highlighted in FIG. 5C. Once selected, a window may be de-selected by again pressing the window/seat area corresponding to that window.

The display on the touch screen user interface 46 may also show an input slider bar 52 for allowing the user to adjust transmittance levels of the selected electro-optic windows to various states of transmission between a clear setting 54 and a dark setting 56. Thus, each window 20a-20g may be individually selected and controlled or the windows may be selectively controlled as a whole set or a subset. The appearance (e.g., shape, shading, or color) of the depictions of the electro-optic windows 20a-20g in the display of touch screen user interface 46 may be varied to indicate their current transmittance level. Further, either the slider bar 52 and/or the selected window(s) could blink while transitioning to the selected transmittance level. The slider bar 52 may be provided as another form of user input, such as discrete buttons representing increase transmittance and decrease transmittance.

The examples shown in FIGS. 5A-5C differ from those in FIGS. 4A and 4B insofar as the touch screen user interface 46 further displays an automatic control input 58 for allowing a user to turn on or off automatic control of the transmittance levels of the selected electro-optic windows whereby the transmittance levels of the selected electro-optic windows are automatically controlled in response to a sensed ambient light level inside the environment (e.g., the cabin of the aircraft). The windows may thus be controlled to maintain a chosen light level within the interior environment. When the automatic control input 58 is turned on, the control slider bar 52 may change appearance to allow a user to select from options such as "Bright," "Cloudy," "Dusk," and "Night." Further, all seats may be automatically selected so as to be controlled in response to the ambient light level. Also, a center icon 60 may appear that may change in appearance depending where the slider bar 52 is located. Turning on the automatic control input 58 may or may not preclude a user from over-riding the auto mode at a selected seat/window location.

In the set up mode, the window control app of the portable control unit 40 uses the Bluetooth transceiver 44 to search for other Bluetooth devices. The Bluetooth transceivers 34 of each window control circuit 30a-30g may transmit periodic signals identifying themselves as a particular type of Bluetooth device. Thus, when searching for other Bluetooth devices, the Bluetooth transceiver 44 would find each of the Bluetooth transceivers 34 when in proximity thereto. Upon finding each of the Bluetooth transceivers 34, the Bluetooth transceiver 44 can transfer the type of Bluetooth device that is found to the processor 44, which can then implement an automatic pairing process to pair with each of the Bluetooth transceivers 34. Likewise, each of the Bluetooth transceivers 34, upon receiving a pairing request from the Bluetooth transceiver 44, would know to accept the request based upon the type of Bluetooth device by which the Bluetooth transceiver 44 identifies itself. After such pairing is complete, the system is set up to allow control signals to be sent from the portable control unit 40 to the window control circuits 30a-30g.

As another step in the set up mode, the processor 42 may be configured to prompt the user to identify the operating environment. For example, the user may select a particular model of aircraft. The processor 42 may use other components of the portable control unit to download an appropriate display 50 corresponding to the selected environment. This task may be accomplished before the pairing steps so that the processor 42 knows how many window control circuits 30a-30g may be present. The app may further provide for the ability of the user to customize the display 50 of the physical layout of the environment.

Another step of the set up mode may be to associate particular actual windows 20a-20g with the depictions of the windows shown on the display 50. One approach is to have each window control circuit 30a-30g configured to have IDs that represent the relative location of the corresponding window 20a-20g relative to the other windows. Another approach would be to allow the user to select a window on display 50 one-by-one and dim it to identify the actual window that is dimming. The window control app would then allow the user to move the window icon to its corresponding actual position. Yet another approach would be to provide an indicator light on each actual window 20a-20g that may be illuminated when the window is selected. The window control app would then allow the user to move the window icon to its corresponding actual position.

Figure 6:
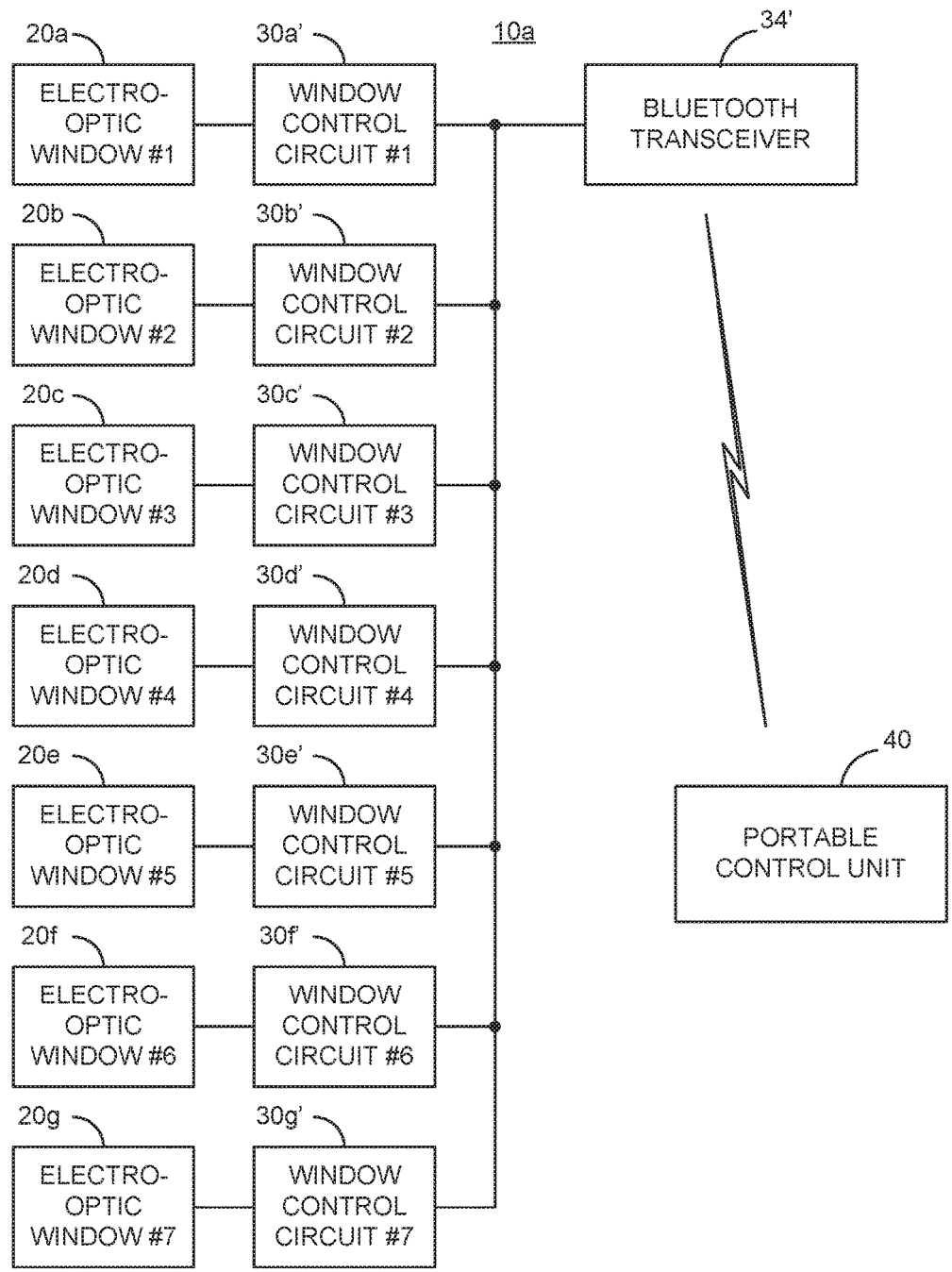
FIG. 6 is an electrical diagram in block form of a window control system according to another embodiment.

FIG. 6 shows a window control system 10a according to another embodiment, that differs from the embodiment shown in FIG. 1 in that a single transceiver 34', such as a Bluetooth transceiver, is used and connected to each window control circuit 30a'-30g'. This embodiment may be useful when the extra physical wiring does not impose any significant problems. Such problems could be further ameliorated by transmitting signals between transceiver 34' and window control circuits 30a'-30g' through existing power lines that provide power to the window control circuits 30a'-30g' and windows 20a-20g.

Figure 7:
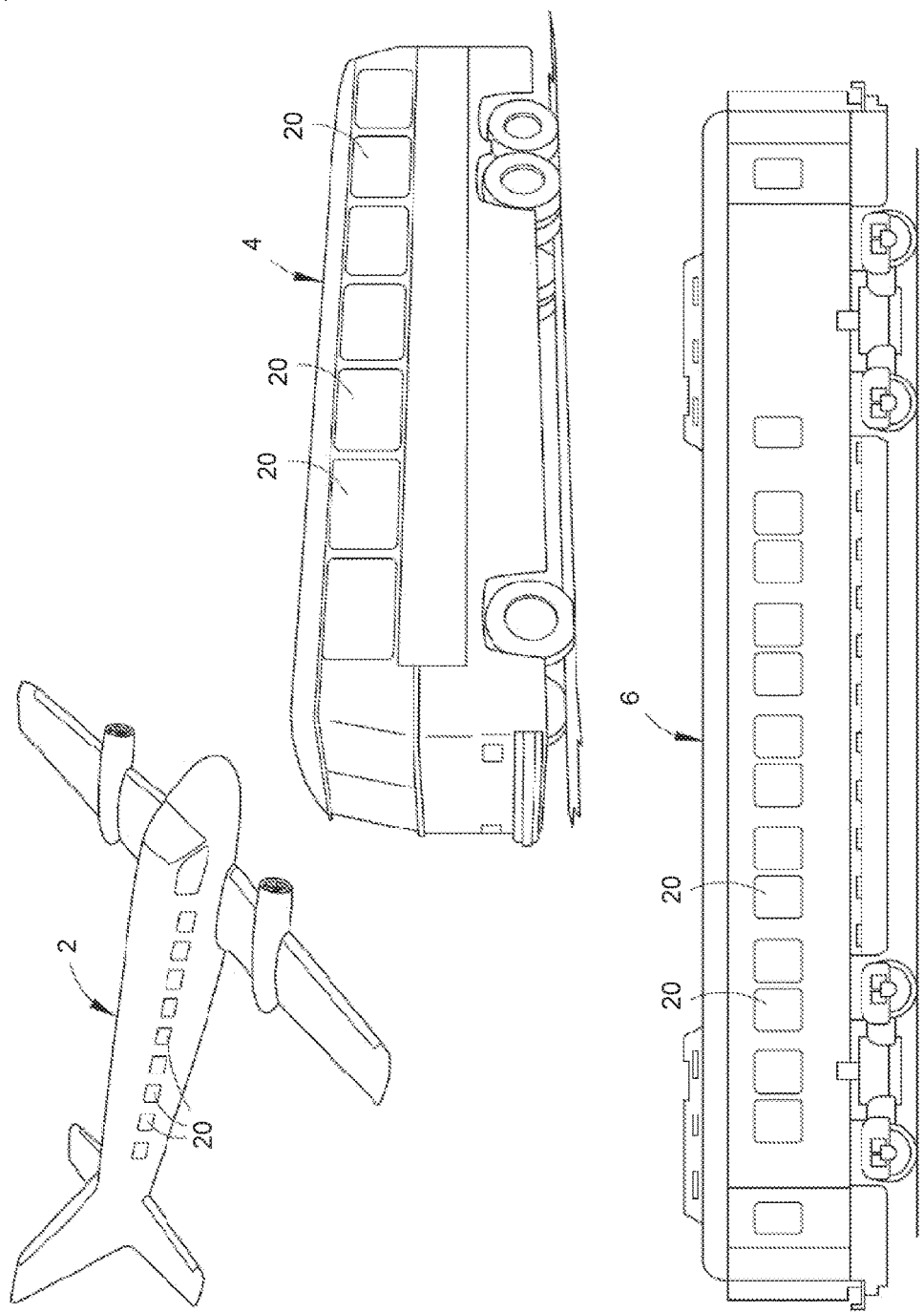
FIG. 7 is a general illustration of multi-passenger vehicles incorporating the window control systems described herein.

In the examples above, the environment including the electro-optic windows 20 has been described as an aircraft. FIG. 7 shows examples of an aircraft 2, a bus 4, and a train car 6 in which the window control system 10 may be implemented. Other vehicles are possible locations as are buildings.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A window control system comprising:
    a plurality of electro-optic windows each having a variable transmittance level;
    a portable control unit for generating wireless control signals for controlling transmittance levels of the plurality of electro-optic windows; and
    a plurality of window control circuits each coupled to a respective one of the plurality of electro-optic windows and each comprising a transceiver for receiving the wireless control signals from the portable control unit, and each configured to adjust the transmittance level of the respective one of the plurality of electro-optic windows in response to a wireless control signal received by the transceiver from the portable control unit.

2. The window control system of claim 1, wherein the portable control unit includes a touch screen user interface that displays a physical arrangement of the plurality of electro-optic windows to allow a user to select which of the plurality of electro-optic windows are to be adjusted.

3. The window control system of claim 2, wherein the touch screen user interface further displays an input slider for allowing the user to adjust transmittance levels of the selected electro-optic windows.

4. The window control system of claim 3, wherein the touch screen user interface further displays an automatic control input for allowing a user to turn on or off automatic control of the transmittance levels of the selected electro-optic windows whereby the transmittance levels of the selected electro-optic windows are automatically controlled in response to a sensed ambient light level.

5. The window control system of claim 2, wherein each of the plurality of electro-optic windows has a unique ID and wherein the portable control unit stores the unique ID of each of the plurality of electro-optic windows such that, upon selection of windows to control, the portable control unit incorporates the unique ID of the selected electro-optic windows into the wireless control signals.

6. The window control system of claim 5, wherein each of the window control circuits stores the unique ID for the respective one of the plurality of electro-optic windows.

7. The window control system of claim 1, wherein the portable control unit is selected from the group consisting of a smartphone, a tablet or a laptop.

8. The window control system of claim 1, wherein the transceiver of each of the plurality of window control circuits is a Bluetooth transceiver and wherein the portable control unit comprises a Bluetooth transceiver for communicating the wireless control signals via a Bluetooth protocol.

9. An aircraft comprising the window control system of claim 1.

10. A non-transitory tangible computer readable medium having stored thereon software instructions that, when executed by a processor of a portable control unit, cause the processor to control transmittance levels of a plurality of electro-optic windows, by executing the steps comprising:
    generating a display on a touch screen of the portable control unit showing a physical arrangement of the plurality of electro-optic windows to allow a user to select which of the plurality of electro-optic windows are to be adjusted;
    receiving the user's selection of which of the plurality of electro-optic windows are to be adjusted; and generating wireless control signals for controlling transmittance levels of the selected electro-optic windows of the plurality of electro-optic windows.

11. The non-transitory tangible computer readable medium of claim 10, wherein the software instructions further cause the processor to execute the step of further generating a display on the touch screen of the portable control unit showing an input slider for allowing the user to adjust the transmittance levels of the selected electro-optic windows.

12. The non-transitory tangible computer readable medium of claim 10, wherein the software instructions further cause the processor to execute the step of further generating a display on the touch screen of the portable control unit showing an automatic control input for allowing a user to turn on or off automatic control of the transmittance levels of the selected electro-optic windows whereby the transmittance levels of the selected electro-optic windows are automatically controlled in response to a sensed ambient light level.

13. The non-transitory tangible computer readable medium of claim 10, wherein each of the plurality of electro-optic windows has a unique ID and wherein the software instructions further cause the processor to execute the step of storing the unique ID of each of the plurality of electro-optic windows such that, upon selection of windows to control, the processor incorporates the unique ID of the selected electro-optic windows into the wireless control signals.

14. An aircraft comprising:
a plurality of electro-optic windows each having a variable transmittance level; and
a plurality of window control circuits each coupled to a respective one of the plurality of electro-optic windows and each comprising a transceiver for receiving wireless control signals from a portable control unit, and each configured to adjust the transmittance level of the respective one of the plurality of electro-optic windows in response to a wireless control signal received by the transceiver from the portable control unit.

15. The aircraft of claim 14, wherein each of the plurality of electro-optic windows has a unique ID and wherein the portable control unit stores the unique ID of each of the plurality of electro-optic windows such that, upon selection of windows to control, the portable control unit incorporates the unique ID of the selected electro-optic windows into the wireless control signals.

16. The aircraft of claim 15, wherein each of the window control circuits stores the unique ID for the respective one of the plurality of electro-optic windows.

17. The aircraft of claim 14, wherein the transceiver of each of the plurality of window control circuits is a Bluetooth transceiver and wherein the portable control unit comprises a Bluetooth transceiver for communicating the wireless control signals via a Bluetooth protocol.

18. The aircraft of claim 17, wherein each of the plurality of electro-optic windows has a unique ID corresponding to an ID of the Bluetooth transceiver of the respective window control circuit and wherein the portable control unit stores the unique ID of each of the plurality of electro-optic windows such that, upon selection of windows to control, the portable control unit incorporates the unique ID of the selected electro-optic windows into the wireless control signals.

19. A window control system comprising:
a plurality of electro-optic windows each having a variable transmittance level;
a portable control unit for generating wireless control signals for controlling transmittance levels of the plurality of electro-optic windows;
a transceiver for receiving the wireless control signals from the portable control unit; and
a plurality of window control circuits each coupled to at least one of the plurality of electro-optic windows and configured to adjust the transmittance level of the at least one of the plurality of electro-optic windows in response to a wireless control signal received by the transceiver from the portable control unit.

20. The window control system of claim 19, wherein the portable control unit includes a touch screen user interface that displays a physical arrangement of the plurality of electro-optic windows to allow a user to select which of the plurality of electro-optic windows are to be adjusted.

21. The window control system of claim 20, wherein the touch screen user interface further displays an input slider for allowing the user to adjust transmittance levels of the selected electro-optic windows.

22. The window control system of claim 21, wherein the touch screen user interface further displays an automatic control input for allowing the user to turn on or off automatic control of the transmittance levels of the selected electro-optic windows whereby the transmittance levels of the selected electro-optic windows are automatically controlled in response to a sensed ambient light level.

23. The window control system of claim 20, wherein each of the plurality of electro-optic windows has a unique ID and wherein the portable control unit stores the unique ID of each of the plurality of electro-optic windows such that, upon selection of windows to control, the portable control unit incorporates the unique ID of the selected electro-optic windows into the wireless control signals.

24. The window control system of claim 23, wherein each of the window control circuits stores the unique ID for the respective one of the plurality of electro-optic windows.

25. The window control system of claim 19, wherein the portable control unit is selected from the group consisting of a smartphone, a tablet or a laptop.

26. The window control system of claim 19, wherein the transceiver is a Bluetooth transceiver and wherein the portable control unit comprises a Bluetooth transceiver for communicating the wireless control signals via a Bluetooth protocol.

* * * * *